H. K. Taylor,
Harvester Rake.
No. 43531 — Patented July 12, 1864.
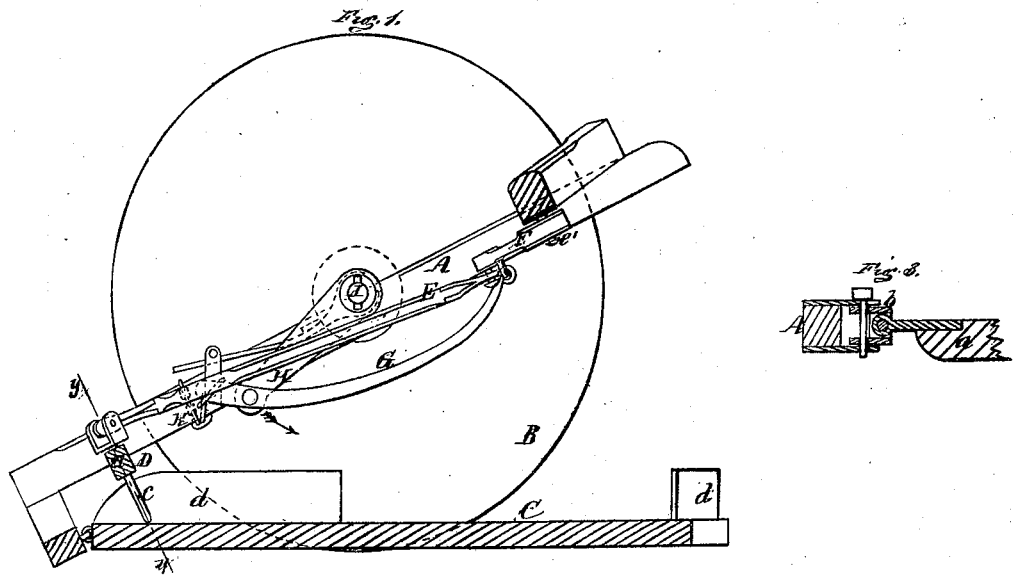
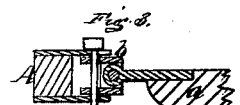
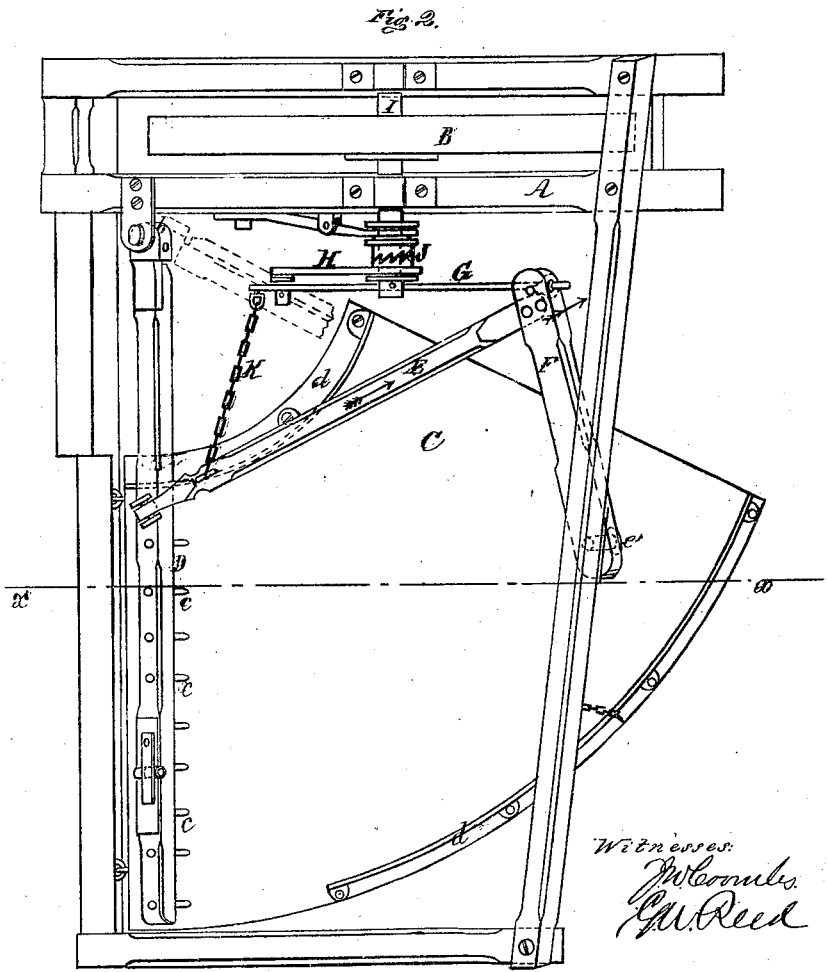
Witnesses:
J. W. Coombs
G. W. Reed
Inventor:
Henry K. Taylor
per
Munn & Co.
Att'ys

UNITED STATES PATENT OFFICE.

HENRY K. TAYLOR, OF RACINE, WISCONSIN.

IMPROVEMENT IN RAKING ATTACHMENTS TO HARVESTERS.

Specification forming part of Letters Patent No. 43,531, dated July 12, 1864.

*To all whom it may concern:*

Be it known that I, HENRY K. TAYLOR, of Racine, in the county of Racine and State of Wisconsin, have invented a new and Improved Raking Attachment for Harvesters; and I do hereby declare that the following is a full, clear, and exact description thereof, which will enable any person skilled in the art to make and use the same, reference being had to the accompanying drawings, making a part of this specification, in which—

Figure 1 is a side sectional view of my invention, taken in the line $x\,x$, Fig. 2; Fig. 2, a plan or top view of the same; Fig. 3, a section of a portion of the same, taken in the line $y\,y$, Fig. 1.

Similar letters of reference indicate corresponding parts in the several figures.

This invention relates to a new and improved self-raking attachment for harvesters; and it consists in the employment or use of a vibrating rake operated through the medium of a crank and pitman, in connection with a lever, connecting-rod, and chain, all arranged in the manner substantially as hereinafter set forth, whereby a reciprocating or vibrating movement is not only given the rake, but also a rising-and-falling one, and the rake made to perform its work in a very efficient manner.

A represents the framing of a harvester; B, the driving-wheel thereof, and C the platform, the latter being of segment form, as shown clearly in Fig. 2.

D is a rake, the arm $a$ of which is attached to the framing A by means of an universal joint, $b$. The rake-teeth $c$ may be of the usual or any proper construction, and the platform C may be provided at each side with an upright guard, $d$, to prevent the cut grain from passing laterally off from the platform. The arm $a$ of rake is connected by a rod, E, with the the outer end of a lever, F, which is attached to the back part of the framing A by a pivot, $e'$. The outer end of this lever F is connected to a pitman, G, which is attached at its front end to a crank, H, placed loosely on the axle I of the wheel B and connected with said axle, when desired, by means of a clutch, J, arranged in the usual or in any proper manner. The rod E, which connects the rake D with the lever F, has a chain, K, attached to it near its front end, and this chain is connected to the front end of the pitman G.

The operation is as follows: As the harvester is drawn along, the crank H, when connected with the axle I, will be rotated and communicate by means of the pitman G, lever F, and rod E, a vibratory movement to the rake D, so that the latter will move in the arc of a circle over the platform C, and in consequence of the rod E being connected by the chain K to the pitman G a rising-and-falling movement as well as a vibratory one is given the rake the latter being elevated by the crank and chain as the former passes over and in front of the axle I, and while the rake is moved from the back to the front end of the platform, the rake falling when it reaches the front end of the platform and raking the cut grain therefrom as it passes to the back end of the platform, when it is again raised by the crank and chain and is moved in an elevated position, free from the platform and cut grain falling thereon, toward the front end of the latter.

Thus it will be seen that by a very simple mechanism an efficient self-raking attachment is obtained and without the employment of gearing.

Having thus described my invention, what I claim as new, and desire to secure by Letters Patent, is—

The rake D, attached to the framing A by means of the universal joint $b$, in connection with the rod E, lever F, pitman G, crank H, and chain K, all being arranged to operate in the manner substantially as and for the purpose herein set forth.

HENRY K. TAYLOR.

Witnesses:
  C. J. REILLY,
  D. MCDONALD.